(12) United States Patent
Hsu et al.

(10) Patent No.: US 8,045,438 B2
(45) Date of Patent: Oct. 25, 2011

(54) HIGH FREQUENCY MODULATION OF A LIGHT BEAM IN OPTICAL RECORDING

(75) Inventors: Chih-Chin Hsu, Taipei Hsien (TW); Chih-Yuan Chen, Changhua County (TW)

(73) Assignee: MediaTek, Inc., Hsin-Chu (TW)

( * ) Notice: Subject to any disclaimer, the term of this patent is extended or adjusted under 35 U.S.C. 154(b) by 0 days.

(21) Appl. No.: 12/773,569

(22) Filed: May 4, 2010

(65) Prior Publication Data

US 2010/0214899 A1 Aug. 26, 2010

Related U.S. Application Data

(62) Division of application No. 11/123,384, filed on May 6, 2005.

(51) Int. Cl.
*G11B 7/00* (2006.01)
(52) U.S. Cl. ...................... 369/59.11; 369/116
(58) Field of Classification Search ............... 369/59.11, 369/116, 47.51
See application file for complete search history.

(56) References Cited

U.S. PATENT DOCUMENTS

| | | | |
|---|---|---|---|
| 4,337,535 A | 6/1982 | Van Megen et al. | |
| 5,606,541 A | 2/1997 | Finkelstein et al. | |
| 5,781,222 A | 7/1998 | Yamawaki et al. | 347/236 |
| 6,421,314 B1 * | 7/2002 | Maruyama | 369/116 |
| 6,552,967 B1 | 4/2003 | Tsutsui et al. | 369/13.27 |
| 6,934,235 B2 | 8/2005 | Seo | 369/59.11 |
| 7,406,012 B2 * | 7/2008 | Kamei | 369/53.18 |
| 2001/0043534 A1 * | 11/2001 | Gyo | 369/53.26 |
| 2003/0185260 A1 * | 10/2003 | Seo | 372/38.02 |

FOREIGN PATENT DOCUMENTS

| | | |
|---|---|---|
| DE | 10017943 | 6/2003 |
| EP | 0204315.6 | 4/2000 |
| JP | 02297731 A * | 12/1990 |
| TW | I231488 | 10/2002 |
| WO | WO 2004038711 A1 * | 5/2004 |

OTHER PUBLICATIONS

Biesterbos et al., "Low-Frequency Mode-Hopping Optical Noise in AlGaAs Channeled Substrate Lasers Induced by Optical Feedback", IEEE Journal of Quantum Electronics, vol. QE-19, No. 6, pp. 986-990 (Jun. 1983).

* cited by examiner

*Primary Examiner* — Latanya Bibbins
(74) *Attorney, Agent, or Firm* — Fish & Richardson P.C.

(57) ABSTRACT

An optical storage system modulates a laser beam based on a high frequency modulation (HFM) signal and a pattern to be recorded on an optical storage medium. At least one of an amplitude and a frequency of the HFM signal is adjusted when using the light beam to record the pattern on the optical storage medium or read data from the medium.

20 Claims, 13 Drawing Sheets

HIGH FREQUENCY MODULATION OF A LIGHT BEAM IN OPTICAL RECORDING

RELATED APPLICATION

This application is a divisional of and claims the benefit of the priority date of U.S. patent application Ser. No. 11/123,384, filed on May 6, 2005, the contents of which are incorporated herein by reference.

BACKGROUND

This description relates to high frequency modulation of a light beam in optical recording.

An optical recording system (e.g., an optical disc drive) records data on an optical recording medium (e.g., an optical disc) by writing marks using a laser beam, which is generated by a laser diode in a pickup head. To read data, the laser beam is directed to the recording medium and reflected light is detected to sense the recorded data. The power level of the laser beam is adjusted depending on whether the recording system writing, erasing, or reading data from the disc. A polarizing beam splitter and quarter wave plates are positioned between the laser diode and the disc, configured to allow the laser beam to propagate from the laser diode to the disc and to re-direct the reflected laser beam towards photo detectors.

A small portion of the reflected laser beam may pass through the polarizing beam splitter and reach the laser diode, causing mode-hopping that results in a high level of noise (also called "return feedback noise"), adversely affecting read and write operations. It is known to apply a high-frequency modulation (HFM) current having a fixed frequency and fixed amplitude to the laser diode, causing the laser diode to operate in multi-mode, which is less sensitive to feedback light and has reduced return feedback noise.

SUMMARY

In general, in one aspect, the invention features an optical recording method that includes modulating a light beam based on a high frequency modulation (HFM) signal and a pattern to be recorded on an optical storage medium. A frequency of the HFM signal is adjusted when using the light beam to record the pattern on the optical storage medium or read data from the medium, the frequency being adjusted from a first value to a second value.

Implementations of the invention may include one or more of the following features. The method includes adjusting an amplitude of the HFM signal when using the light beam to record the pattern on the optical storage medium or read data from the medium, the amplitude being adjusted from a first value to a second value. The frequency of the HFM signal is adjusted to reduce an error rate when reading from the medium, such as reducing an error rate of reading data or decoding addresses in wobble signals from the medium. The frequency of the HFM signal is adjusted in response to a change in a recording speed, a change in a write power level of the light beam, or a change in velocity mode, such as from a constant linear velocity mode to a constant angular velocity mode, and vice versa. The frequency of the HFM signal is adjusted based on a selection of one of at least two light sources for generating the light beam. The frequency of the HFM signal is adjusted depending on whether the light beam is at a write power level, an erase power level, or a read power level, the write power level being used for recording a mark on the storage medium, the erase power level being used for erasing a mark on the storage medium, and the read power level being used for reading recorded marks on the storage medium. The frequency of the HFM signal is adjusted depending on whether the light beam is used for reading from the medium or for writing to the medium. Adjusting the frequency of the HFM signal includes selecting one of at least two HFM current generators to generate an electric current to drive the light source. The HFM signal has a frequency greater than 150 MHz. The modulation of the light beam is compatible with at least one of a CD-R, CD-RW, DVD-R, DVD+R, DVD-RW, DVD+RW, double layer DVD-R, double layer DVD+R, Blu-ray Disc, and High-Definition DVD (HD-DVD) standard.

In general, in one aspect, the invention features a method of operating an optical storage system that includes, when using a light beam to write a pattern on an optical storage medium or read data from the medium, adjusting an amplitude of a high frequency modulation (HFM) signal that is used to modulate the light beam, the amplitude being adjusted based on a change in operation mode of the optical storage system.

Implementations of the invention may include one or more of the following features. The amplitude of the HFM signal is adjusted in response to a change in a write power level of the light beam. The amplitude of the HFM signal is adjusted depending on whether the light beam is at a write power level, an erase power level, or a read power level, the write power level being used for writing a '1' signal on the storage medium, the erase power level being used for writing the '0' signal on the storage medium, and the read power level being used for reading recorded signals or wobble signals on the storage medium. The amplitude of the HFM signal is adjusted depending on whether the light beam is used for reading from the medium or for writing to the medium.

In general, in another aspect, the invention features an optical recording method that includes modulating a light beam according to a pattern to be recorded on an optical storage medium and a high frequency modulation (HFM) signal. At least one of an amplitude and a frequency of the HFM signal is determined based on a type of the optical storage medium, at least one of the amplitude and the frequency being different for different types of optical storage media.

Implementations of the invention may include the following features. At least one of the amplitude and the frequency of the HFM signal is different for at least two of CD-R, CD-RW, DVD-R, DVD+R, DVD-RW, DVD+RW, double layer DVD-R, double layer DVD+R Blu-ray Disc, and High-Definition DVD (HD-DVD) recording media.

In general, in another aspect, the invention features an optical recording method that includes modulating a light beam according to a pattern to be recorded on an optical storage medium and a high frequency modulation (HFM) signal, and determining at least one of an amplitude and a frequency of the HFM signal based on a selection of one of at least two light sources for generating the light beam, at least one of the amplitude and the frequency being different for different light sources.

In general, in another aspect, the invention features an optical recording method that includes modulating a light beam based on a trial write pattern and a high frequency modulation (HFM) signal, using the light beam to record trial write marks on an optical storage medium, detecting recorded trial write marks on the medium, and adjusting at least one characteristic of the HFM signal based on detected recorded trial write marks.

Implementations of the invention may include one or more of the following features. The characteristic includes at least one of a frequency and an amplitude. The method includes determining optimum values for the frequency and amplitude of the HFM signal that result in the least error rate based on the detected recorded trial write marks. The method includes modulating the light beam based on user data and the HFM signal that is adjusted based on the detected trial write marks. The characteristic of the HFM signal is adjusted according to at least one of a first write strategy, a second write strategy, a third write strategy, and a fourth write strategy. The first write strategy specifies that the characteristic of the HFM signal is different for different signal levels of the trial write pattern. The second write strategy specifies that the characteristic of the HFM signal is different depending on whether the light beam is used to read from the medium or to write to the medium. The third write strategy specifies that the characteristic of the HFM signal is different depending on the type of optical storage medium being used. The fourth write strategy specifies that the characteristic of the HFM signal is different depending on the type of light source being used to generate the light beam.

In general, in another aspect, the invention features a method of operating an optical system for retrieving data from an optical medium, including modulating a read beam with a high frequency modulation (HFM) signal, and adjusting characteristics, e.g., frequency or amplitude, of the HFM signal in response to a change in operation mode.

Implementations of the invention may include one or more of the following features. The optical system may include two or more laser diodes for reading from different types of optical media. The frequency or amplitude of the HFM signal is determined based on a selection one of the laser diodes, in which different frequencies or amplitudes are used for different laser diodes. The characteristics of the HFM signal is adjusted in response to a change in velocity mode, such as from a constant linear velocity mode to a constant angular velocity mode, and vice versa. The frequency or amplitude of the HFM signal is determined based on the type of medium being accessed.

In general, in another aspect, the invention features a method of reading data from an optical storage medium, including determining a characteristic of a high frequency modulation (HFM) signal based on a selection of a wavelength of a read beam that is used to read data from the optical storage medium, the wavelength being selected from among at least two possible wavelengths, the characteristic of the HFM signal being different for at least two different wavelengths. The read beam is modulated with the HFM signal, and the read beam is used to read data from the optical storage medium.

Implementations of the invention may include one or more of the following features. The characteristic includes at least one of a frequency and an amplitude of the HFM signal. The characteristic of the HFM signal is determined so as to reduce an error rate when reading from the medium. One of the two possible wavelengths corresponds to an infrared or red laser, and the other of the two possible wavelengths corresponds to a blue laser.

In general, in another aspect, the invention features an optical storage apparatus that includes a light source driver to drive a light source based on a high frequency modulation (HFM) signal and a pattern to be recorded on an optical storage medium, and circuitry to adjust at least one of an amplitude and a frequency of the HFM signal when recording the pattern on the optical storage medium or reading data from the medium.

Implementations of the invention may include one or more of the following features. The apparatus includes an encoder to generate the pattern according to an eight-to-fourteen modulation of user data. The circuitry adjusts at least one of the amplitude and frequency of the HFM signal in response to a change in a recording speed, a change in a write power level of the light beam for recording a mark on the optical storage medium, or a change between a constant linear velocity mode and a constant angular velocity mode. The circuitry adjusts at least one of the amplitude and frequency of the HFM signal depending on whether the light beam is at a write power level, an erase power level, or a read power level, the write power level being used for recording a mark on the storage medium, the erase power level being used for erasing a mark on the storage medium, and the read power level being used for reading recorded marks or wobble signals on the storage medium. The circuitry selectively adjusts the amplitude of the HFM signal between a specified level and zero depending on an amplitude of the pattern. The light source driver includes at least two HFM current generators that have different frequencies and/or amplitudes. The HFM signal has a frequency greater than 150 MHz. The light source driver drives the light source to generate a light beam that is compatible with at least one of a CD-R, CD-RW, DVD-R, DVD+R, DVD-RW, DVD+RW, double layer DVD+R, double layer DVD R, Blu-ray Disc, and High-Definition DVD (HD-DVD) standard. The circuitry includes registers to store values for specifying at least two sets of frequencies and amplitudes.

In general, in another aspect, the invention features an optical storage apparatus that includes a light source driver to drive a light source according to a high frequency modulation (HFM) signal and a pattern to be recorded on an optical storage medium, and circuitry to determine at least one of an amplitude and a frequency of the HFM signal based on a type of the optical storage medium, at least one of the amplitude and the frequency being different for different types of optical storage media.

Implementations of the invention may include the following features. The circuitry determines different amplitudes and/or frequencies for the HFM signal for at least two of CD-R, CD-RW, DVD-R, DVD+R, DVD-RW, DVD+RW, Blu-ray Disc, and High-Definition DVD (HD-DVD) recording media.

In general, in another aspect, the invention features an optical storage apparatus that includes a light source driver to drive a light source according to a high frequency modulation (HFM) signal and a trial write pattern to be recorded on an optical storage medium, a detector to detect recorded trial write marks on the medium, and circuitry to adjust at least one of an amplitude and a frequency of the HFM signal based on detected trial write marks.

Implementations of the invention may include one or more of the following features. The light source driver drives the light source according to user data and the HFM signal having a frequency and/or amplitude adjusted by the circuitry based on detected trial write marks. The circuitry determines at least one of the amplitude and the frequency of the HFM signal according to at least one of a first write strategy, a second write strategy, a third write strategy, and a fourth write strategy. The first write strategy specifies that the amplitude of the HFM signal is different for different signal levels of the trial write pattern. The second write strategy specifies that the frequency of the HFM signal is different for different signal levels of the trial write pattern. The third write strategy specifies that the amplitude of the HFM signal is different depending on whether the light beam is used to read from the medium or to write to the medium. The fourth write strategy specifies that the frequency of the HFM signal is different depending on whether the light beam is used to read from the medium or to write to the medium.

In general, in another aspect, the invention features an optical storage system that includes means for generating a laser driving signal for driving a laser module having at least one laser diode, the laser driving signal having a high frequency modulation component, and means for adjusting an optical characteristics of the high frequency modulation component to reduce return-feedback noise.

Implementations of the invention may include one or more of the following features. The optical characteristics includes at least one of a frequency and an amplitude of the high frequency modulation component. The adjusting means adjusts the optical characteristics in response to at least one of (1) a change in a recording speed, (2) a change in a write power level of the laser, (3) a change in velocity mode, (4) a selection of one of at least two light sources for generating the light beam, (5) a change in a power level of the laser between a write power level, an erase power level, and a read power level, (6) a change between a read mode and write mode, (7) a change in a type of recording medium used in the optical storage system, and (8) a change in an output wavelength of the laser module.

In general, in one aspect, the invention features an optical system that includes a pickup head that generates a read beam that is modulated with a high frequency modulation (HFM) signal, and circuitry to adjust at least one of an amplitude and a frequency of the HFM signal when reading from an optical storage medium.

Implementations of the invention may include one or more of the following features. The optical system may include two or more laser diodes for reading from different types of optical media. The frequency or amplitude of the HFM signal is determined based on a selection one of the laser diodes, in which different frequencies or amplitudes are used for different laser diodes. The characteristics of the HFM signal is adjusted in response to a change in velocity mode, such as from a constant linear velocity mode to a constant angular velocity mode, and vice versa. The frequency or amplitude of the HFM signal is determined based on the type of medium being accessed.

In general, in one aspect, the invention features a machine readable code that causes a machine to implement functions including modulating a light beam based on a high frequency modulation (HFM) signal and a pattern to be recorded on an optical storage medium, and adjusting a frequency of the HFM signal when using the light beam to record the pattern on the optical storage medium or read data from the medium, the frequency being adjusted from a first value to a second value.

Implementations of the invention may include one or more of the following features. The machine readable code also causes the machine to implement the functions of adjusting an amplitude of the HFM signal when using the light beam to record the pattern on the optical storage medium or read data from the medium, the amplitude being adjusted from a first value to a second value. The frequency of the HFM signal is adjusted to reduce an error rate when reading from the medium, such as reducing an error rate of reading an address in pre-groove (ADIP) signal from the medium. The frequency of the HFM signal is adjusted in response to a change in a recording speed, a change in a write power level of the light beam, or a change in velocity mode, such as from a constant linear velocity mode to a constant angular velocity mode, and vice versa. The frequency of the HFM signal is adjusted based on a selection of one of at least two light sources for generating the light beam. The frequency of the HFM signal is adjusted depending on whether the light beam is at a write power level, an erase power level, or a read power level, the write power level being used for recording a mark on the storage medium, the erase power level being used for erasing a mark on the storage medium, and the read power level being used for reading recorded marks on the storage medium. The frequency of the HFM signal is adjusted depending on whether the light beam is used for reading from the medium or for writing to the medium. Adjusting the frequency of the HFM signal includes selecting one of at least two HFM current generators to generate an electric current to drive the light source. The HFM signal has a frequency greater than 150 MHz. The modulation of the light beam is compatible with at least one of a CD-R, CD-RW, DVD-R, DVD+R, DVD-RW, DVD+RW, double layer DVD-R, double layer DVD+R, Blu-ray Disc, and High-Definition DVD (HD-DVD) standard.

Unless otherwise defined, all technical and scientific terms used herein have the same meaning as commonly understood by one of ordinary skill in the art to which this invention belongs. All of the publications, patent applications, patents, and other references mentioned are incorporated herein by reference. In case of conflict with the references incorporated by reference, the present specification, including definitions, will control.

DESCRIPTION

An optical recording system reduces return feedback noise by varying characteristics of a high-frequency modulation (HFM) current applied to a laser diode based on the operation mode of the recording system. The characteristics include, e.g., frequency and amplitude. For example, the HFM current may have a first frequency and first amplitude during a read mode, and a second frequency and second amplitude during a write mode. During the write mode in which an encoded signal, such as an eight-to-fourteen modulated (EFM) signal, is recorded to a disc, the frequency and amplitude of the HFM current may depend on the signal level of the encoded signal. For example, the HFM current may have a first frequency and amplitude when the EFM signal is high, and a second frequency and/or amplitude when the EFM signal is low. The characteristics of the HFM current may also depend on the type of disc being accessed. A trial write process may be used to find optimum combinations of frequencies and amplitudes for different modes of operations.

Figure 1:
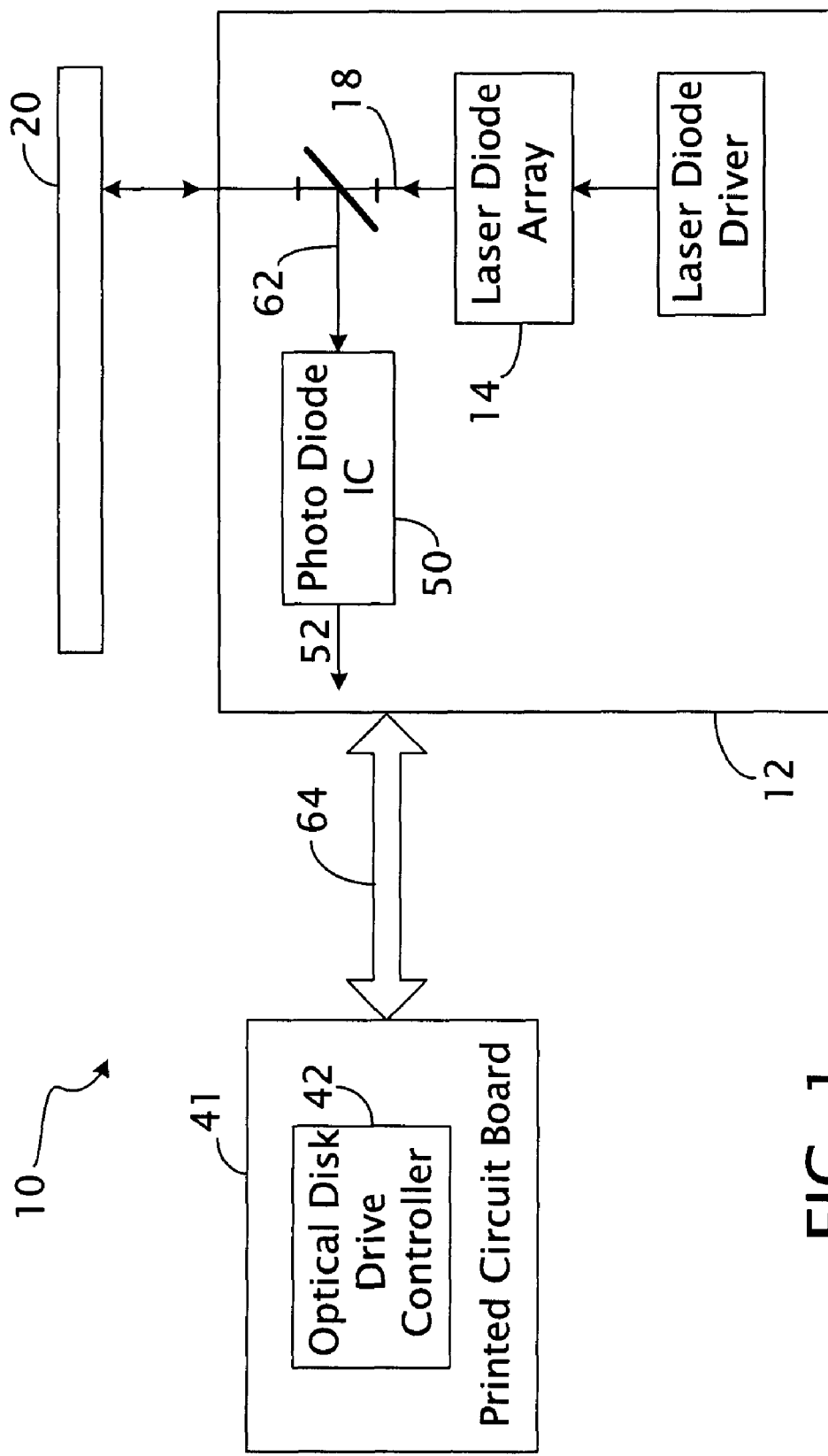
FIG. 1 shows an optical recording system.

Referring to FIG. 1, an optical recording system 10 includes a pickup head 12 connected to a printed circuit board 41 through a flexible cable 64. An optical disc drive controller 42 is mounted on the circuit board 41 to encode data sent to the pickup head 12 and decode signals received from the pickup head 12. The pickup head 12 includes a laser diode driver 11 that generates a laser driving current for driving a laser diode array 14, which includes at least one laser diode for generating a laser beam 18 that is directed towards an optical disc 20. Light reflected from the disc 20 is detected by a photo detector integrated circuit 50.

Figure 2:
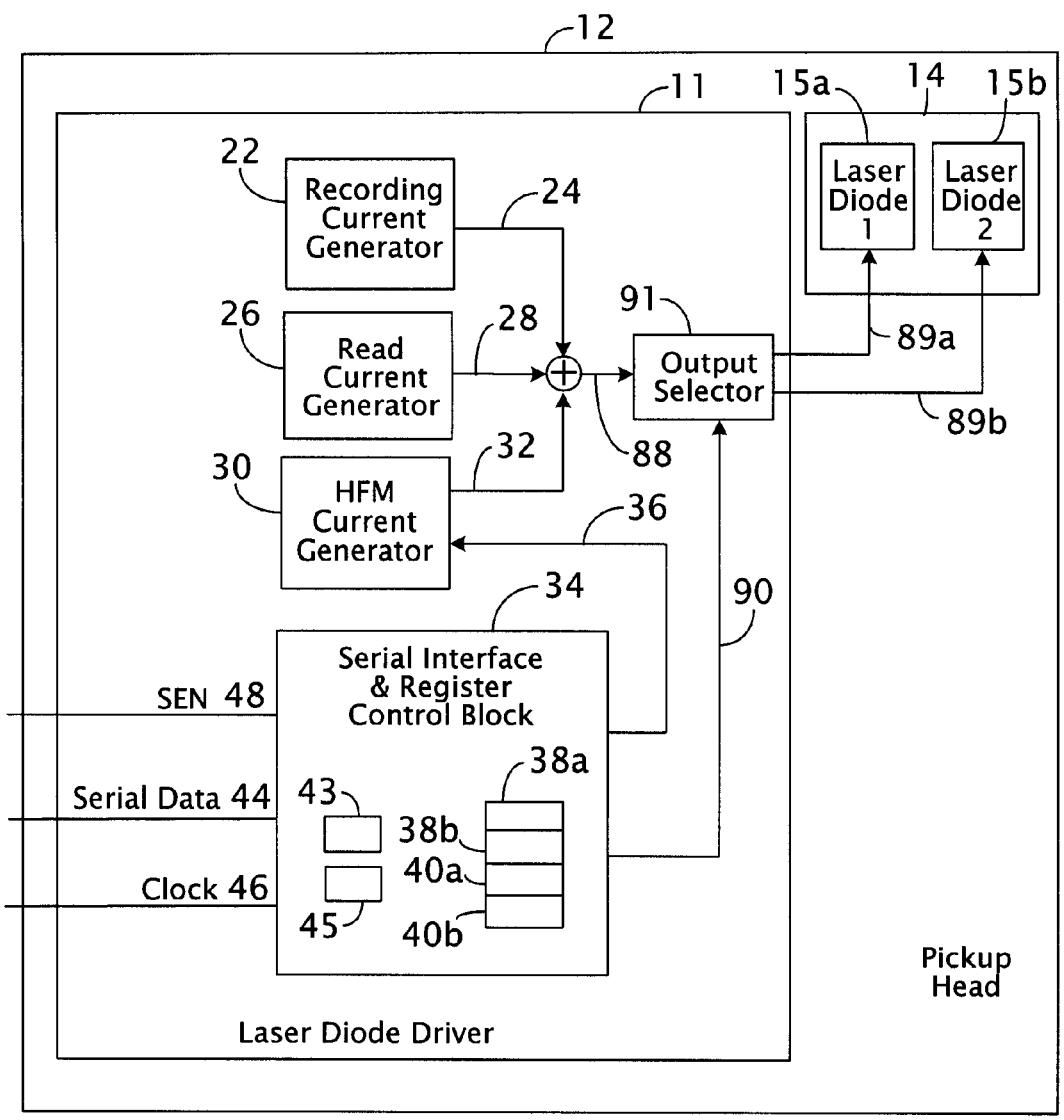
FIG. 2 shows a laser diode driver.

Referring to FIG. 2, the laser diode driver 11 includes a recording current generator 22 that generates a recording current 24 for driving the laser diode array 14 during a write operation. The recording current generator 22 typically has two or more write channels, each generating a recording current signal having a waveform that complies with the write strategy associated with a particular type of disc. For example, see Philips and Sony's Recordable Disc Standard (Yellow Book) and Rewritable Disc Standard (Orange Book) for descriptions of the write strategies for writing to CD-R and CD-RW discs, respectively. A read current generator 26 generates a read current 28 for driving the laser diode 14 during a read operation.

A programmable HFM current generator 30 generates an HFM current 32 that is selectively added to the recording current 24 during a write operation, or to the read current 28 during a read operation, to generate the laser driving current 88. A serial interface and register control block 34 generates a control signal 36 that controls the frequency and amplitude of the HFM current 36.

The control block 34 includes four 8-bit registers 38a, 38b, 40a, and 40b, which store values that are used to determine the frequency and amplitude, respectively, of the HFM current 32 added to the recording current 24 when writing to the disc 20 (registers 38a, 38b), or when reading from the disc 20 (registers 40a, 40b). Each register has 8 bits, so each of the frequency and amplitude of the HFM current 32 can be set to one of 256 levels. For CD and DVD recording systems, the HFM current 32 has a frequency between, e.g., 200 MHz and 500 MHz.

The control block 34 receives serial data 44, a clock signal 46, and a serial interface enable (SEN) signal 48 from the optical disc drive controller 42. The serial data 44 are used to set the values in the registers in the control block 34.

In some examples, the laser diode array 14 includes a first laser diode 15a and a second laser diode 15b. The laser diode 15a generates a laser beam having a wavelength of about 780 nm, and is used when the disc 20 is a CD type disc, such as a CD-audio, CD-ROM, or CD-R disc. The laser diode 15b generates a laser beam having a wavelength of about 650 nm, and is used when the disc 20 is a DVD type disc, such as a DVD-R, DVD+R, DVD-RW, DVD+RW, double layer DVD-R, or double layer DVD+R disc. A register 43 stores a value for determining whether to use laser diode 15a or 15b. The control block 34 generates a control signal 90 based on the value in the register 43 to control an output selector 91 that determines whether the laser drive current 88 is used to drive the laser diode 15a or 15b through signal line 89a or 89b, respectively.

Referring again to FIG. 1, the photo diode integrated circuit 50 detects laser light 62 that is reflected from the disc 20 and redirected by a beam splitter 13, and generates an output 52 that has information about the track wobble and data recorded on the disc 20. The photo diode IC has three quad-section photo detectors, as shown in U.S. patent application Ser. No. 11/077,668, filed Mar. 11, 2005, titled "Land/Groove Track and Pickup Head Movement Direction Detection", herein incorporated by reference. The output 52 includes outputs from the photo detectors, which are used to generate a wobble signal, an RF signal, and a tracking error signal. The RF signal includes the data written on the disc 20. The wobble signal and the tracking error signal are used to position the pickup head 12 on specific locations on the disc 20.

The wobble signal has a carrier signal that is used to generate a recording clock and control a spindle motor that determines the rotation speed of the disc. The wobble signal is modulated with address information, also called address in pregroove (ADIP). The ADIP allows the system 10 to write data to or read data from specific address locations on the disc 20. Generating an accurate wobble signal derived from the output 52 allows the system 10 to generate an accurate write clock, accurately control the rotation speed of the disc, and correctly determine the ADIP.

The photo diode IC 50 has a frequency response up to about 110 MHz, which is less than the frequency of the HFM current 32 (200 MHz to 500 MHz). Thus, the high frequency component in the reflected laser light 62 caused by the HFM current 32 is filtered out and does not appear in the output 52.

Figure 3:
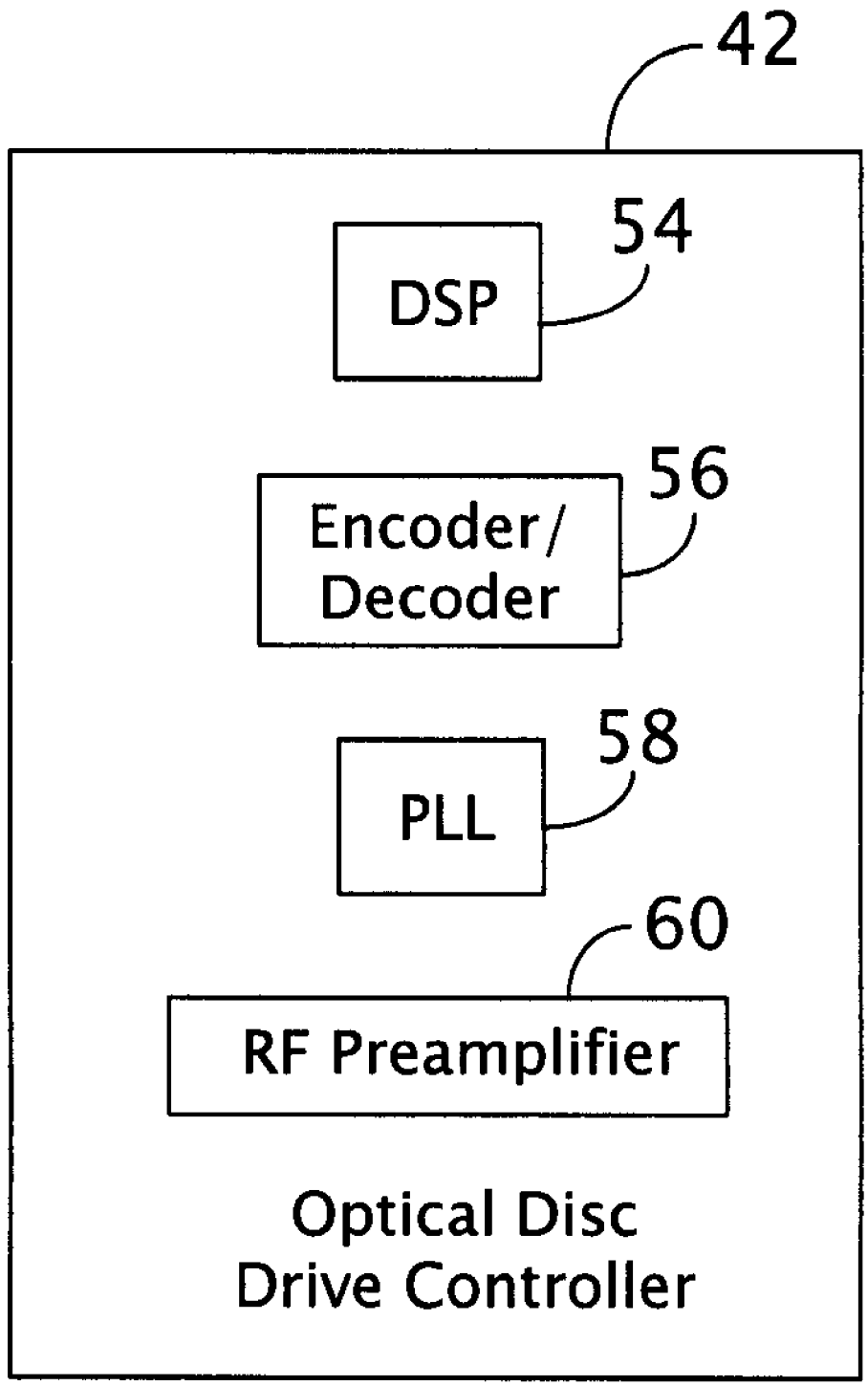
FIG. 3 shows a disc drive controller.

Referring to FIG. 3, the optical disc drive controller 42 includes a digital signal processor 54, an encoder/decoder 56, a phase-lock loop 58, and an RF preamplifier 60. The digital signal processor 54 performs signal processing for disc drive servo control. The encoder/decoder 56 encodes data to be written to the disc 20 according to the eight-to-fourteen modulation, and decodes encoded data read from the disc 20. The phase-lock loop 58 provides synchronization functions, including synchronizing a wobble signal detected from the disc 20 with a write clock signal. The RF preamplifier 60 amplifies the RF signal derived from the output signal 52.

It is useful to adjust characteristics of the HFM current 32 depending on whether the system 10 is in the read mode or in the record (write) mode because the particular frequency and amplitude of the HFM current 32 that result in the least error rate may be different for a read process and a recording process.

Figure 4:
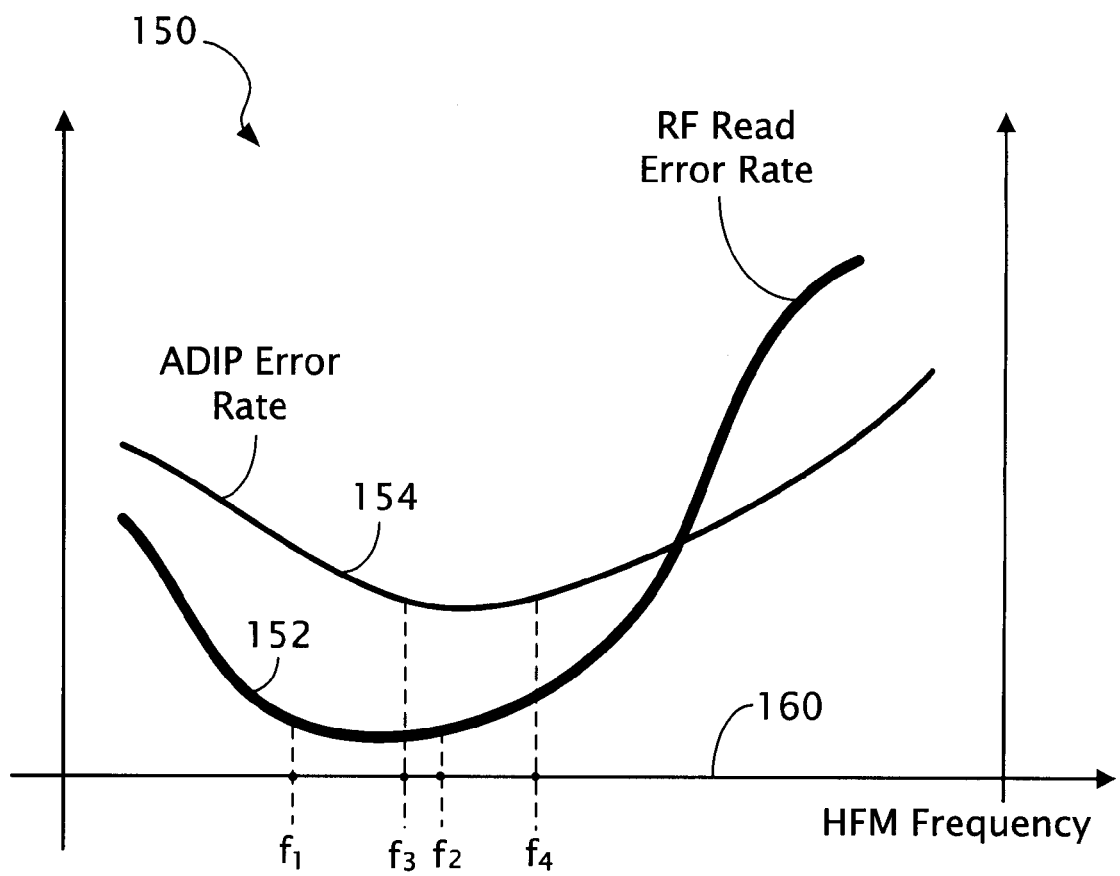
FIGS. 4-8 show graphs.

In the graph 150 of FIG. 4, a curve 152 represents the RF read error rate measured over different frequencies of the HFM current 32 (represented by the horizontal axis 160). The RF signal includes data read from the disc 20, and the RF read error rate represents the error rate of the data derived from the RF signal. A second curve 154 represents the ADIP error rate measured over different frequencies of the HFM current 32. The ADIP signal includes address information, and is used during the record mode to position the write beam at specific addresses on the disc 20. A larger error rate in the ADIP signal will result in a higher error rate in the data written on the disc 20.

The curve 152 shows that the data read from the disc 20 has a lower error rate when the HFM current 32 has a frequency between f1 and f2. The curve 154 shows that the ADIP signal has a lower error rate when the HFM current 32 has a frequency between f3 and f4. Thus, it is useful to set the HFM current 32 to have a frequency between f1 and f2 during the read mode, and set the HFM current 32 to have a frequency between f3 and f4 during the record mode.

Measurements can be performed to determine the ranges of amplitude of the HFM current 32 that would result in lower RF read error rate and lower ADIP error rate, respectively. Measurements can be performed to determine the ranges of amplitude and frequency of the HFM current 32 that would result in lower RF read error rate and lower ADIP error rate, respectively, when the EFM signal is at a high level and a low level, and for different types of discs.

The optimum HFM frequency and amplitude may depend on the type of pickup head 12 being used and the circuitry for controlling the pickup head 12, thus the values of registers 38a, 38b, 40a, and 40b may be set to different values for different recording systems 10.

Figure 5:
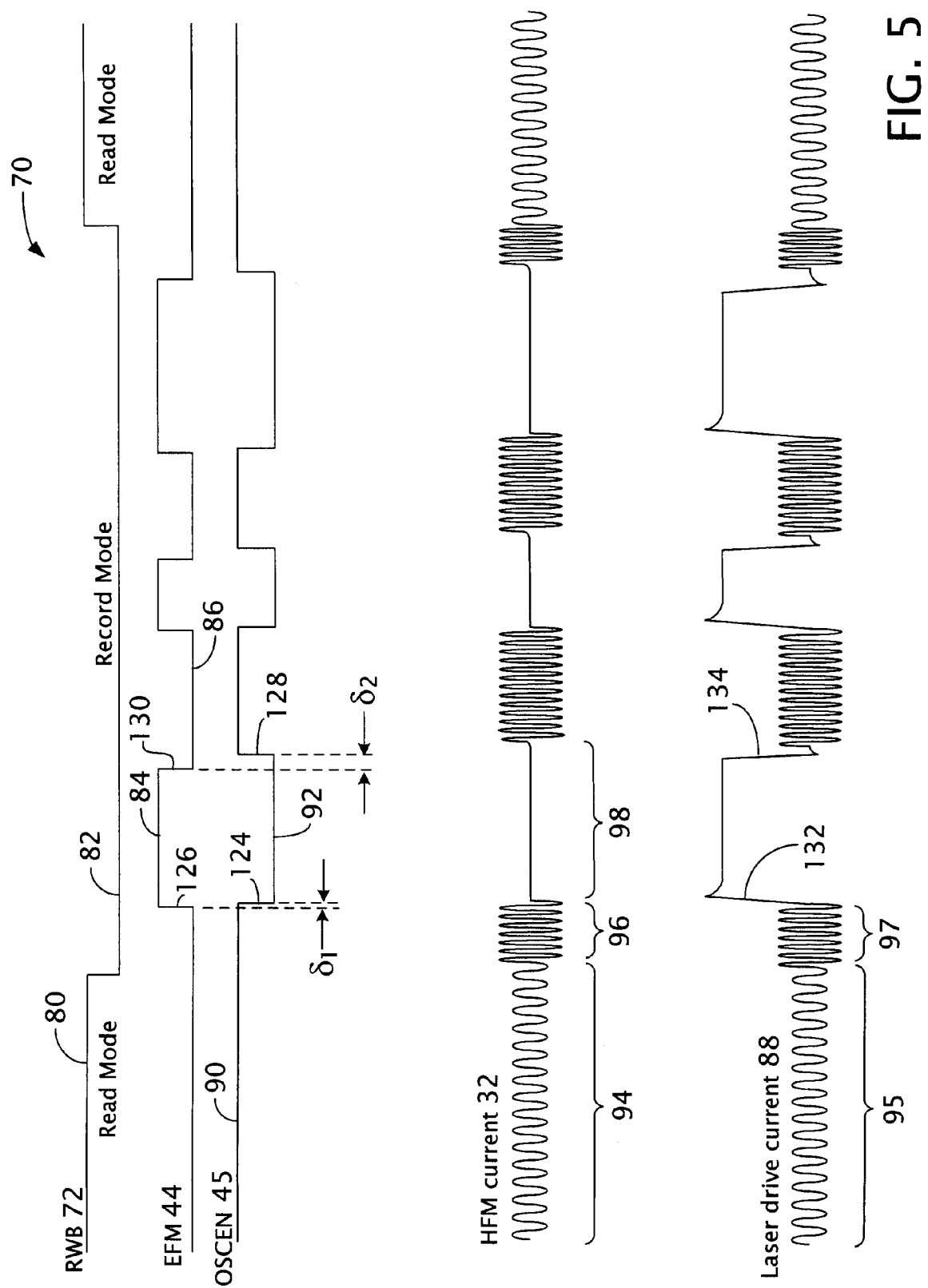

FIG. 5 shows graphs 70 of signals that are generated by one example of the optical recording system 10, in which the frequency and amplitude of the HFM current 32 are adjusted based on whether the system 10 is in a read mode or a write mode. The HFM current 32 is turned on only when the EFM signal 44 is at a low level. In this example, the disc 20 is a recordable disc (also called a write-once disc). In the graphs 70, the horizontal axis (not shown) represents time, and the vertical axis (not shown) represents signal levels.

The disc drive controller 42 sends a read/write mode indication signal (RWB) 72 to the laser diode driver 11. The signal 72 represents whether the system 10 is in the read mode (e.g., 80) or the record mode (e.g., 82) by having a high or low signal level, respectively. During the read mode, the EFM signal 44 has a low level (e.g., 86). During the write mode, the EFM signal 44 alternates between a high level (e.g., 84) and a low level (e.g., 86), depending on whether a 1 or a 0, respectively, is to be written to the disc 20. When the EFM signal 44 is high, a higher recording current 24 is generated to write a mark (or pit) on the disc 20, in which the mark has a reflectivity lower than surrounding regions. When the EFM signal 44 is low, the recording current 24 is either low or turned off, so that no mark is written on the disc. The regions of the disc 20 having marks are called pit or mark regions, and the regions of the disc not having marks are called land or space regions.

The control block 34 generates an oscillation enable signal 45 that indicates whether the HFM current 32 is turned on or off. In this example, the oscillation enable signal 45 is high or low when the EFM signal 44 is at a low or high level, respectively. The falling edge (e.g., 124) of the oscillation enable signal 45 slightly lags the rising edge (e.g., 126) of the EFM signal 44 by an amount δ1 that takes account of the lag between the rising edge (e.g., 132) of the laser drive current 88 and the rising edge (e.g., 126) of the EFM signal 44. The rising edge (e.g., 128) of the oscillation enable signal 45 slightly lags the falling edge (e.g., 130) of the EFM signal 44 by an amount δ2 that takes account of the lag between the falling edge (e.g., 134) of the laser drive current 88 and the falling edge (e.g., 130) of the EFM signal 44.

When the oscillation enable signal 45 is high, the HFM current 32 is turned on, and has a frequency and amplitude determined by the control block 34. The HFM current 32 is turned off (e.g., 98) when the oscillation enable signal 45 is low.

When the system 10 is in the read mode, the control block 34 uses the values stored in registers 38a and 38b to determine the frequency and amplitude of the EFM current 32. The HFM current 32 has a lower frequency and a lower amplitude (e.g., 94) when in the read mode. During the record mode, the control block 34 uses the values stored in registers 40a and 40b to determine the frequency and amplitude of the EFM current 32. The HFM current 32 has a higher frequency and a higher amplitude (e.g., 96) when in the record mode. The laser drive current 88 has an HFM component 95 having a lower frequency and smaller amplitude during the read mode, and has an HFM component 97 having a higher frequency and larger amplitude during the write mode when the EFM signal is low. The laser drive current 88 does not have an HFM component when the EFM signal is high.

Figure 6:
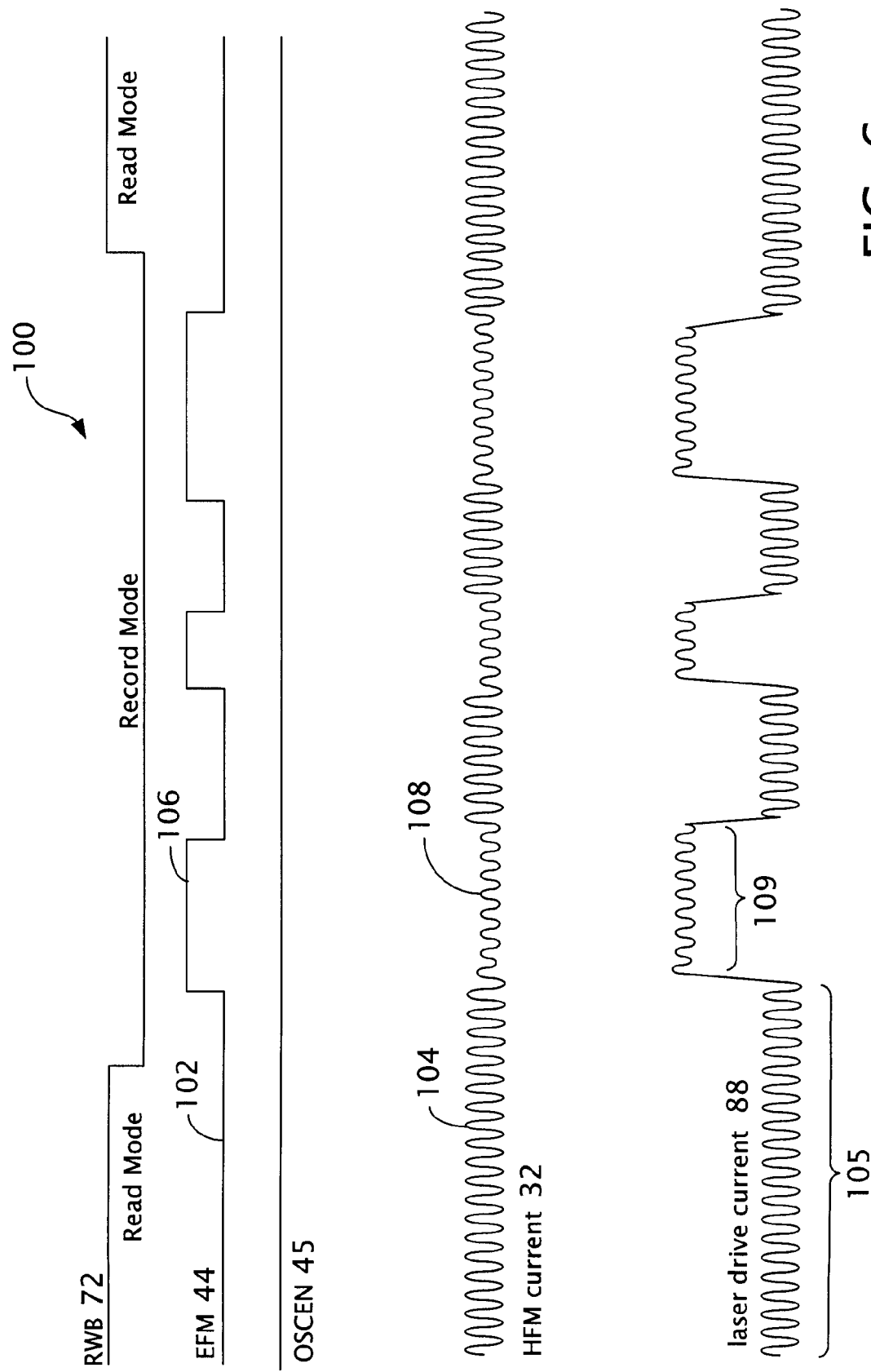

FIG. 6 shows graphs 100 of signals that are generated by another example of the optical recording system 10, in which the control block 34 is configured so that the oscillation enable signal 45 is high (and thus the HFM current 32 is turned on) when the EFM signal 44 is either high or low, and the amplitude of the HFM current 32 is adjusted based on whether the EFM signal 44 is at a high level or a low level. When the EFM signal 44 is low (e.g., 102), the HFM current 32 has a larger amplitude (e.g., 104). When the EFM signal 44 is high (e.g., 106), the HFM current 32 has a smaller amplitude (e.g., 108). The laser drive current 88 has an HFM component (e.g., 105) having a larger amplitude when the EFM signal is low, regardless of whether the system 10 is in the read mode or the record mode. The laser drive current 88 has an HFM component 109 having a smaller amplitude when the EFM signal is high.

Figure 7:
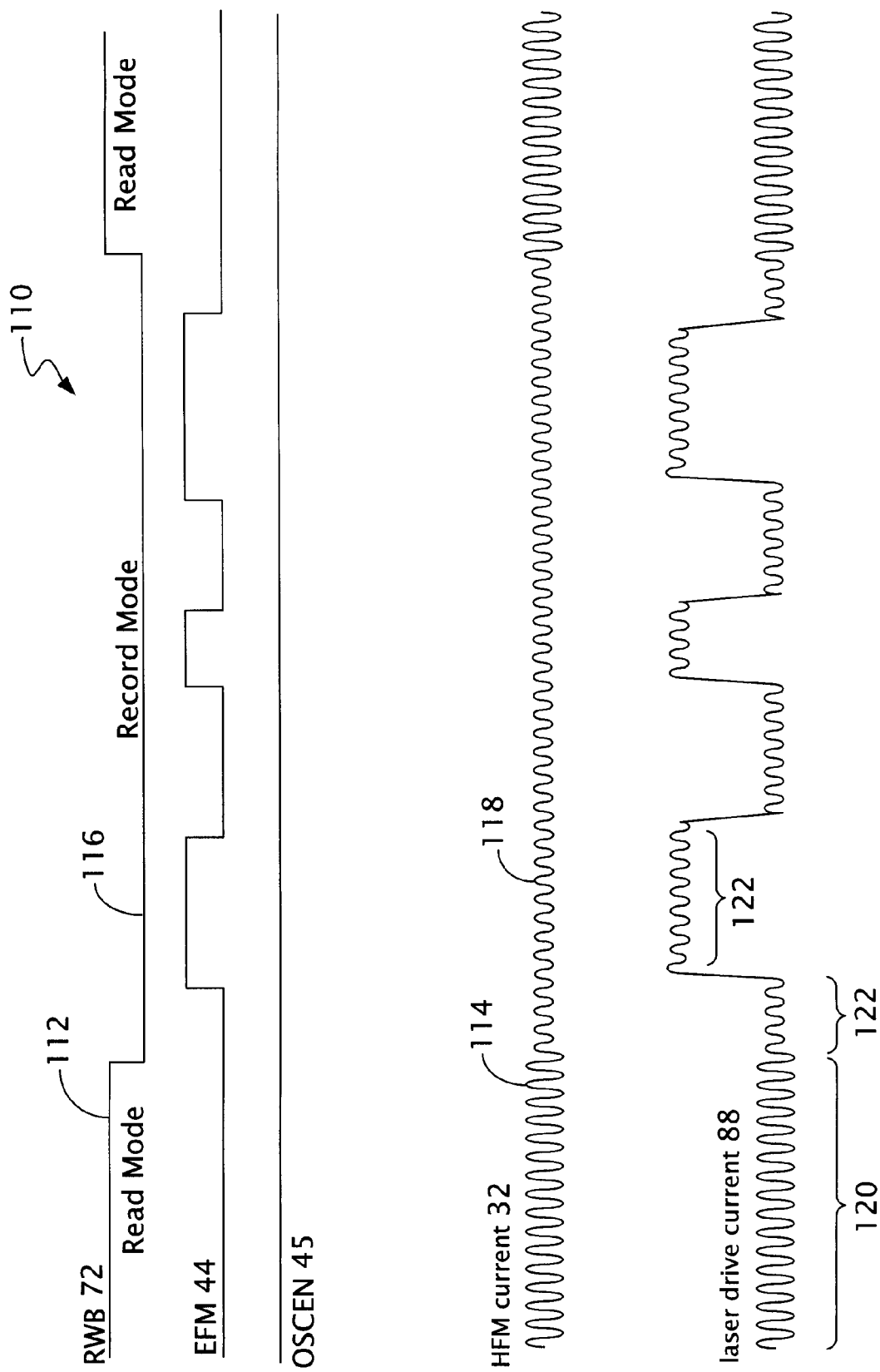

FIG. 7 shows graphs 110 of signals that are generated by another example of the optical recording system 10, in which the control block 34 is configured so that the oscillation enable signal 45 is high (and thus the HFM current 32 is turned on) when the EFM signal 44 is either high or low, and the amplitude of the HFM current 32 is adjusted based on whether the system 10 is in the read mode or the record mode. When the system 10 is in the read mode (e.g., 112), the HFM current 32 has a larger amplitude (e.g., 114). When the system 10 is in the record mode (e.g., 116), the HFM current 32 has a smaller amplitude (e.g., 118). The laser drive current 88 has an HFM component 120 having a larger amplitude when the system 10 is in the read mode, and has an HFM component 122 having a smaller amplitude when the system 10 is in the record mode, regardless of whether the EFM signal 44 is high or low.

Figure 8:
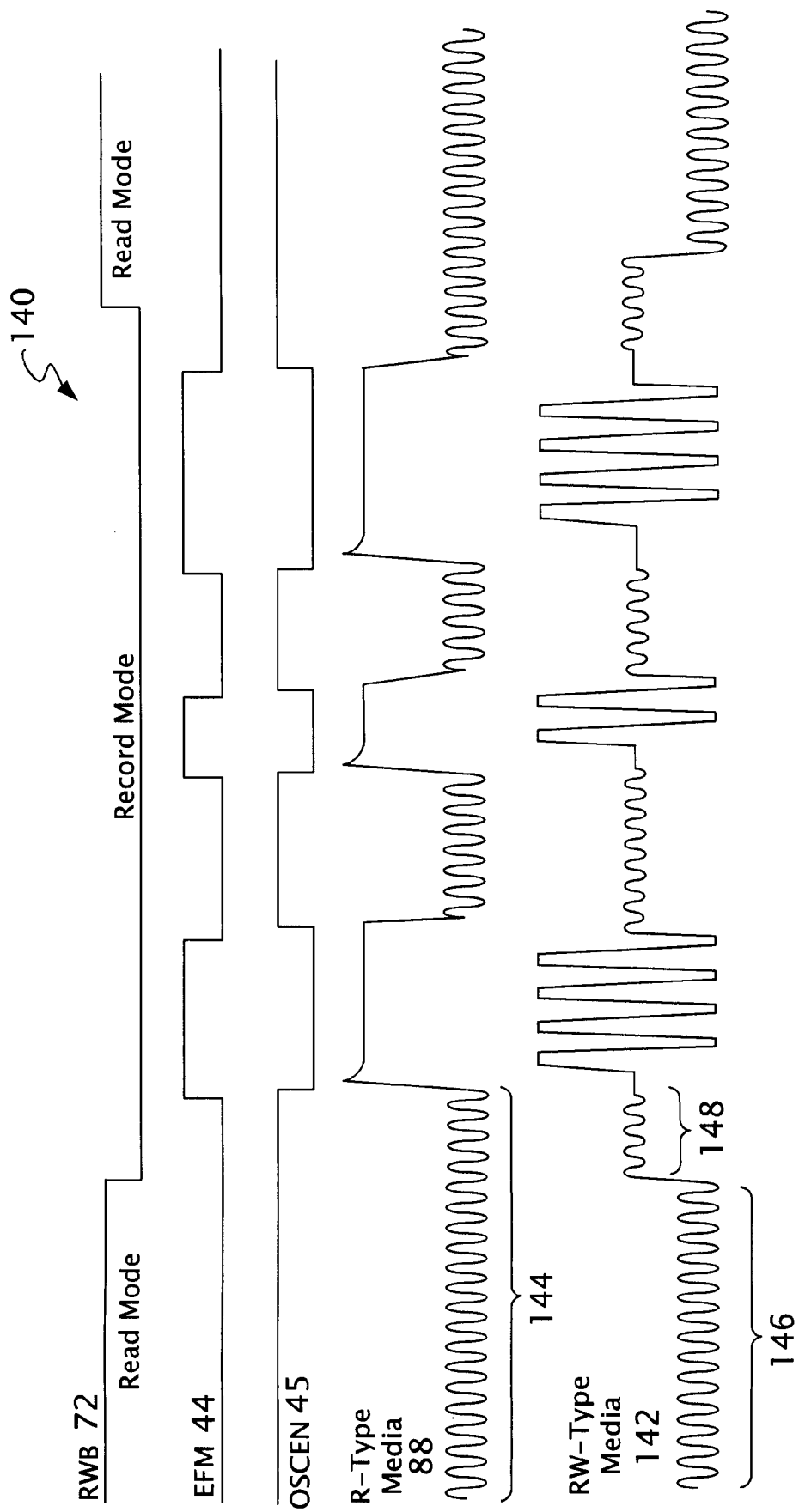

FIG. 8 shows graphs 140 of signals that are generated by another example of the optical recording system 10, in which the HFM current 32 is adjusted depending on whether the disc 20 is a recordable (write-once) disc (e.g., CD-R, DVD-R, or DVD+R) or a rewriteable disc (e.g., CD-RW, DVD-RW, DVD+RW).

The control block 34 is configured so that, when the disc 20 is a recordable disc, the oscillation enable signal 45 is high during the read mode, and alternates between high and low depending on whether the EFM signal is low or high, respectively. The rising and falling edges of the oscillation enable signal 45 slight lags the falling and rising edges, respectively, of the EFM signal 44 to take account of the lag between the laser driving current 88 and the EFM signal 44. The frequency and amplitude of the HFM current 32 remains the same regardless of whether the system 10 is in the read mode or the record mode. The laser driving current 88 has an HFM component 144 when the EFM signal is low.

When the disc 20 is a rewriteable disc, the oscillation enable signal 45 is high during the read mode, and alternates between high and low depending on whether the EFM signal is low or high, respectively, similar to the case when the disc 20 is a recordable disc. The recording current 24 has a waveform that follows rewriteable disc standards. In the example of FIG. 8, the recording current 24 is at an erase level when the EFM signal is low, and the recording current 24 alternates between a write level and a bias or cooling level when the EFM signal is high.

The HFM current 32 has a larger amplitude when the system 10 is in the read mode, and has a smaller amplitude when the system 10 is in the record mode. Thus, the laser driving current 88 has an HFM component (e.g., 146) having a larger amplitude when the system 10 is in the read mode. The laser driving current 88 has an HFM component (e.g., 148) having a smaller amplitude when the system 10 is in the record mode and when the EFM signal 44 is low.

Figure 9:
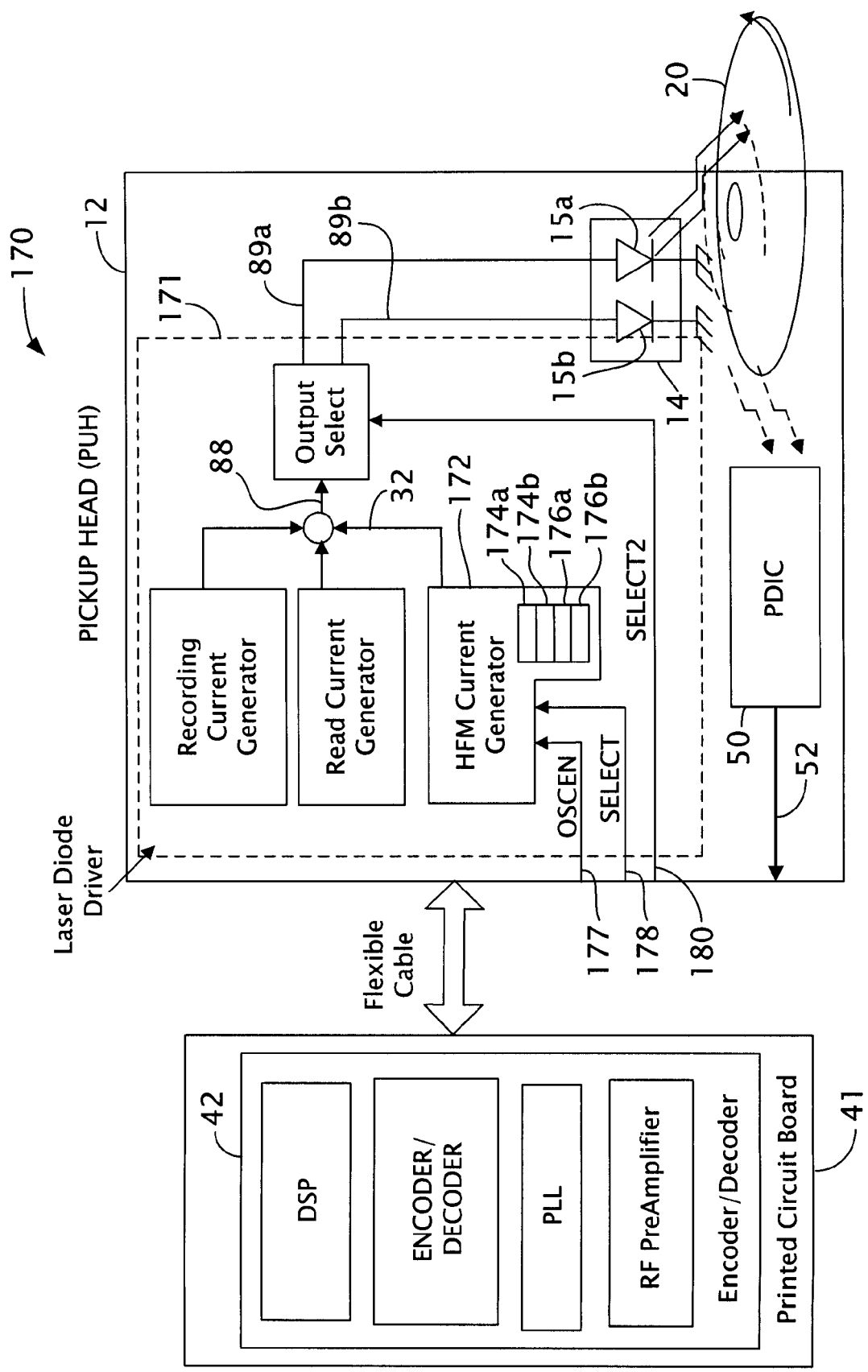
FIG. 9 shows an optical recording system.

FIG. 9 shows an example of an optical recording system 170 that has a laser diode driver 171 that is similar to the laser diode driver 11 (FIG. 2), except that the laser diode driver 171 does not have a serial interface and register control block. The laser diode driver 171 includes an HFM current generator 172 that has resistors for setting the frequency and amplitude of the HFM current 32. For example, resistors 174a and 174b have preset values that are used to specify a first set of frequency and amplitude for the HFM current 32. Resistors 176a and 176b have present values that are used to specify a second set of frequency and amplitude for the HFM current 32.

The HFM current generator 172 receives a select signal 178 that is used to select one of resistor pairs (174a, 174b) or (176a, 176b) to determine the frequency and amplitude of the HFM current 32. The HFM current generator 172 receives an oscillation enable signal 177 that indicates when the HFM current 32 is turned on or off.

For example, to generate the laser drive current 88 shown in FIG. 5, during the read mode, the oscillation enable signal 177 is high and the select signal 178 has a low level to select the resistor pairs 174a and 174b. During the record mode, when the EFM signal 44 is low, the oscillation enable signal 177 is high and the select signal 178 has a high level to select the resistor pairs 176a and 176b, so that the frequency and amplitude of the HFM current 32 is different from those during the read mode. When the EFM signal 44 is high, the oscillation enable signal 177 turns low, and the HFM current 32 is turned off.

A second select signal 180 is used to determine whether the laser drive current 88 is applied to the laser diode 15a or 15b.

Figure 10:
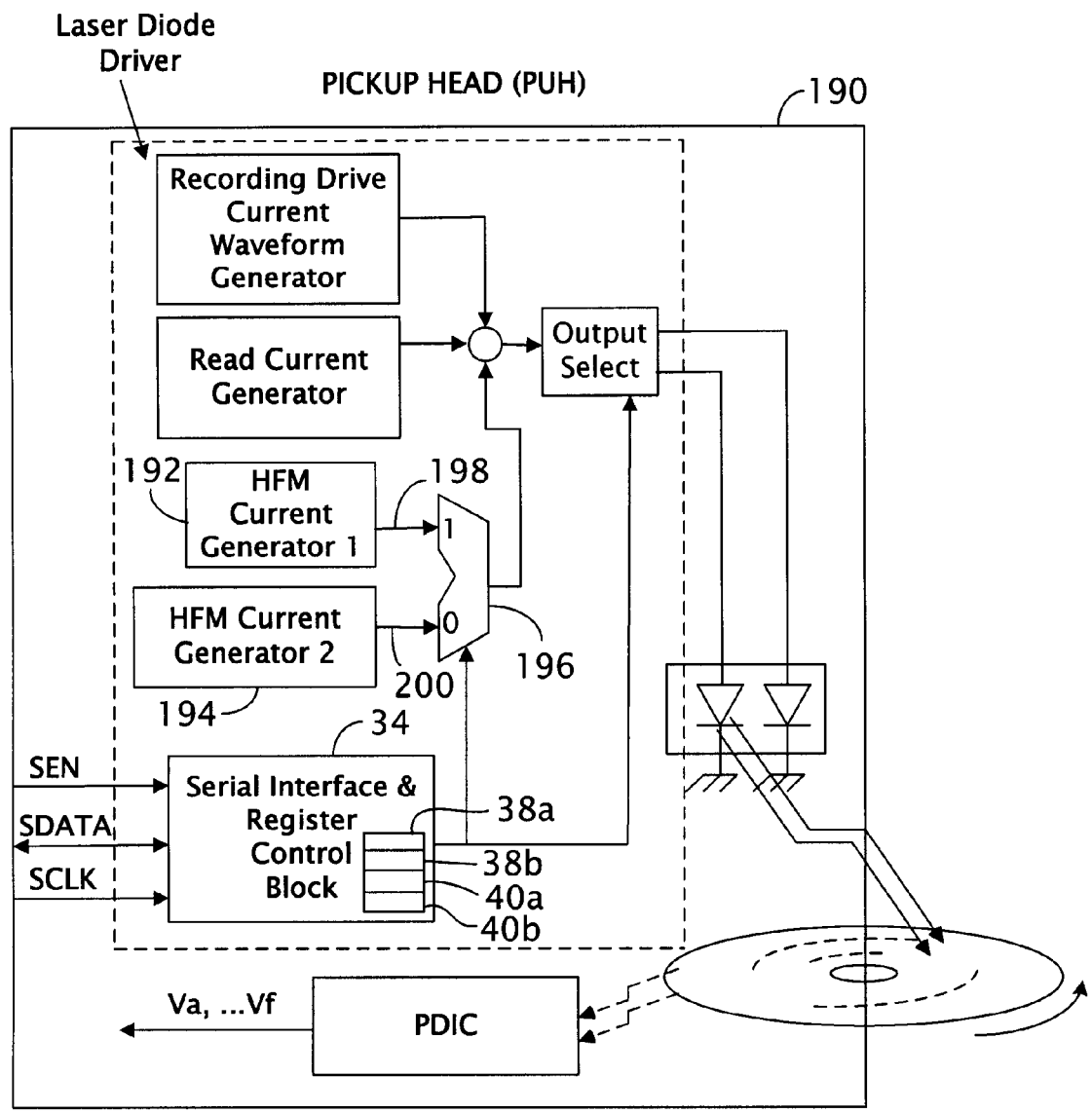
FIGS. 10 and 11 show optical pickup heads.

FIG. 10 shows an example of an optical pickup head 190 that is similar to the pickup head 12 in FIG. 2, except that the pickup head 190 has two HFM current generators 192 and 194 that generate HFM current signals 198 and 200, respectively. The frequency and amplitude of the first HFM current signal 198 are determined by the values stored in the registers 38a and 38b of the control block 34. The frequency and amplitude of the second HFM current signal 200 are determined by the values stored in the registers 40a and 40b of the control block 34. The control block 34 controls a multiplexer 196 to select one of the HFM current signals 198 and 200.

Figure 11:
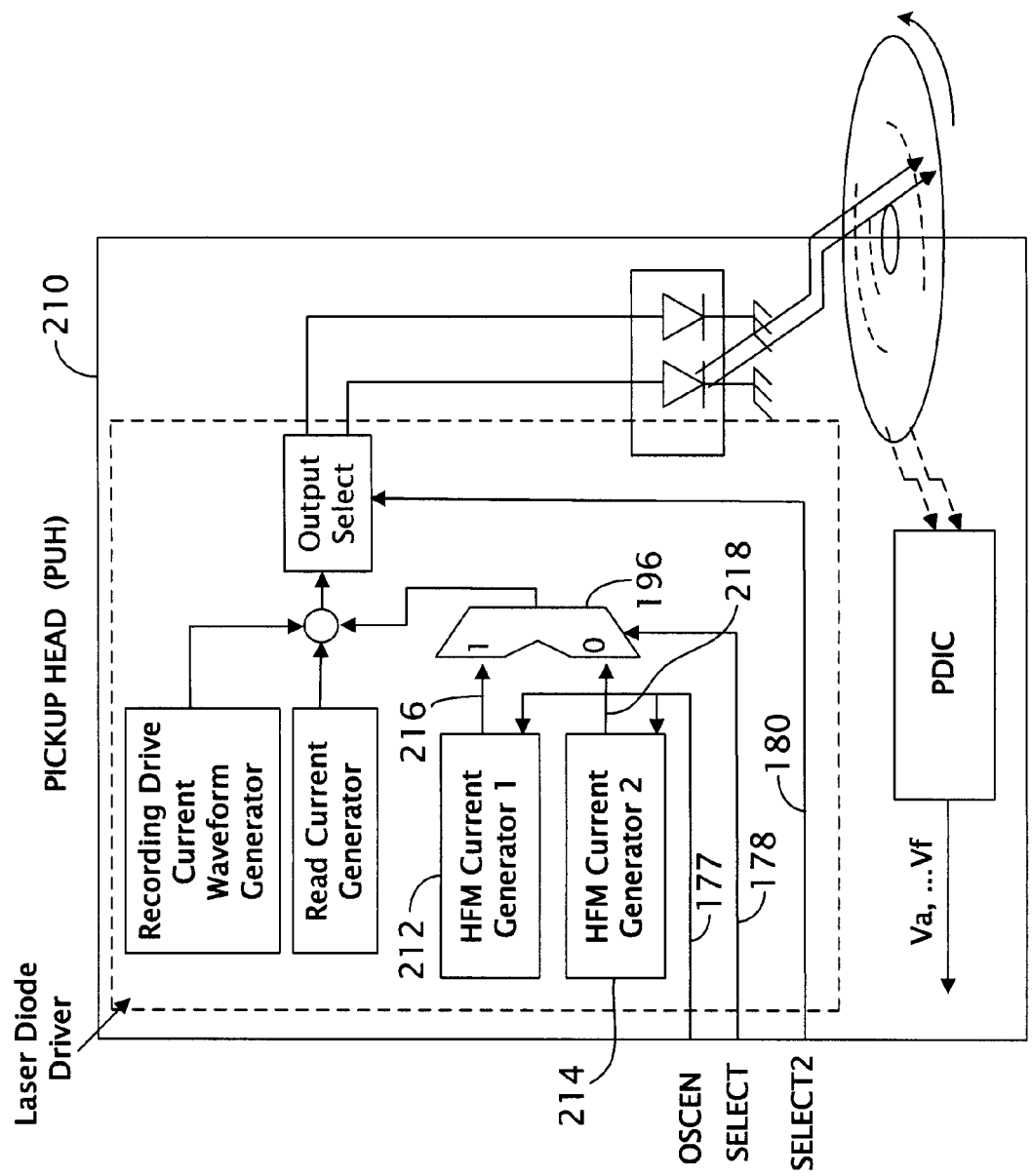

FIG. 11 shows an example of an optical pickup head 210 that is similar to the pickup head of recording system 170 of FIG. 9, except that the pickup head 210 has two HFM current generators 212 and 214 that generate HFM current signals 216 and 218, respectively. Each HFM current generator has two resistors that specify the frequency and amplitude of the HFM current signals, and the two HFM current signals 216 and 218 are set to have different frequencies and/or amplitudes. The oscillation enable signal 48 determines whether the HFM current generators 212 and 214 generate the HFM current signals, and the select signal 178 controls a multiplexer that selects one of the HFM current signals 216 and 218.

Figure 12:
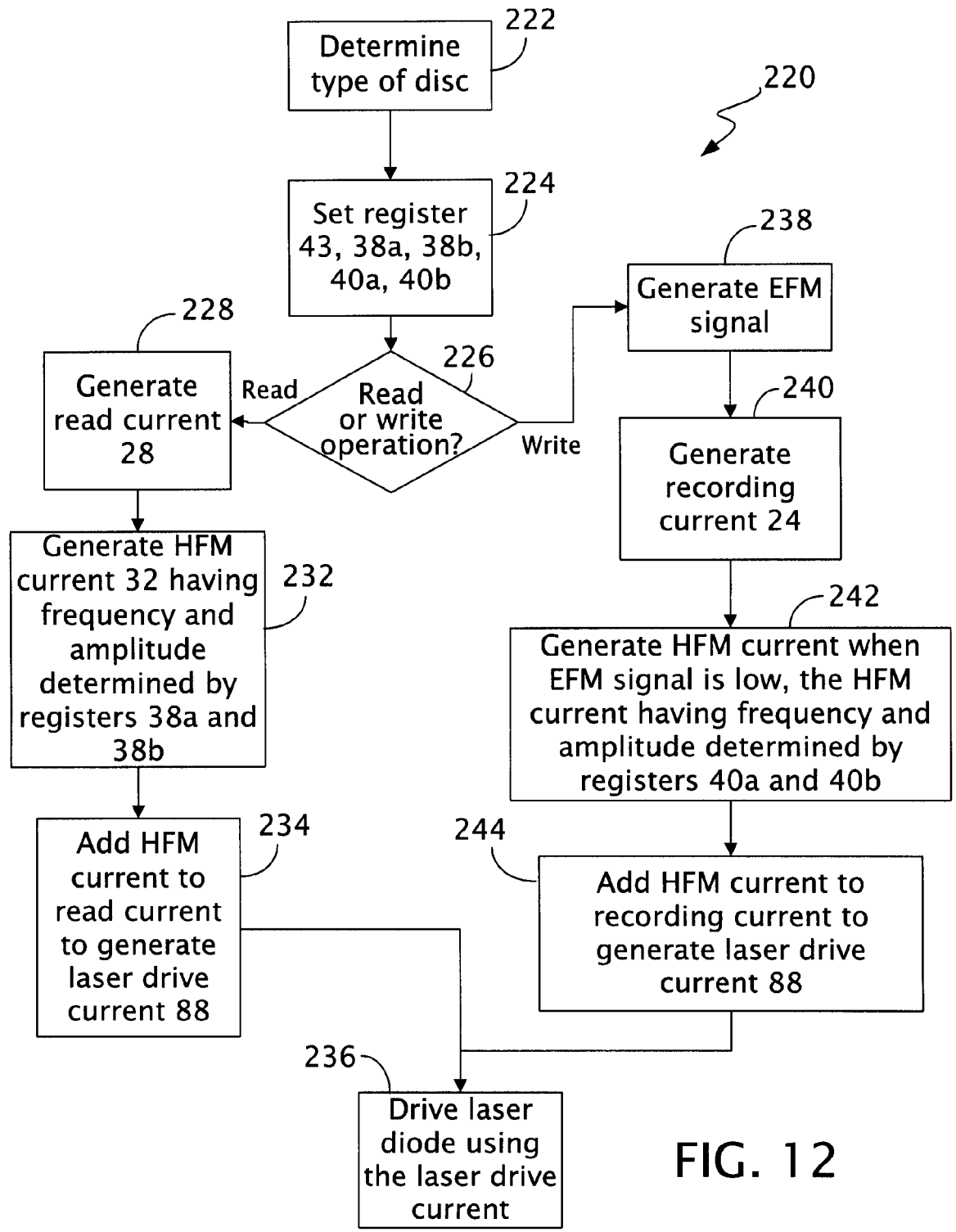
FIGS. 12 and 13 show processes.

FIG. 12 shows a process 220 for accessing the optical disc 20 in which the frequency and amplitude of the HFM current 32 is varied according to the waveforms in FIG. 5 to reduce return feedback noise. The disc drive controller 42 determines 222 the type of disc (e.g., CD or DVD), and sets 224 the values of the registers 43, 38, 38b, 40a, and 40c in the control block 34 to specify which laser diode to use (15a or 15b) and specify the frequencies and amplitudes of the HFM current 32 in different situations.

The disc drive controller 42 determines 226 whether a read operation or a write operation is performed. In the case of a read operation, the laser diode driver 11 generates 228 the read current 28, and generates 232 the HFM current 32 having a frequency and an amplitude determined by the registers 38a and 38b. The HFM current 32 is added 234 to the read current 28 to generate the laser drive current 88, which is used to drive 236 the laser diode selected according to the value of the register 43.

In the case of the write operation, the disc drive controller 42 generates 238 an EFM signal 44 based on the data to be written to the disc 20. The laser diode driver 11 generates 240 the recording current 28, and generates 242 the HFM current 32 having a frequency and amplitude determined by the registers 40a and 40b when the EFM signal 44 is low. The HFM current 32 is added 244 to the recording current 24 to generate the laser drive current 88, which is used to drive 236 the laser diode selected according to the value of the register 43.

The values to be written into the registers 38a, 38b, 40a, and 40b can be stored in firmware, which can be updated from time to time. The register values can also be determined based on a trial write process to take into account changes in system parameters, such as degradation of laser diode output, dust accumulation in lens, and so forth.

Figure 13:
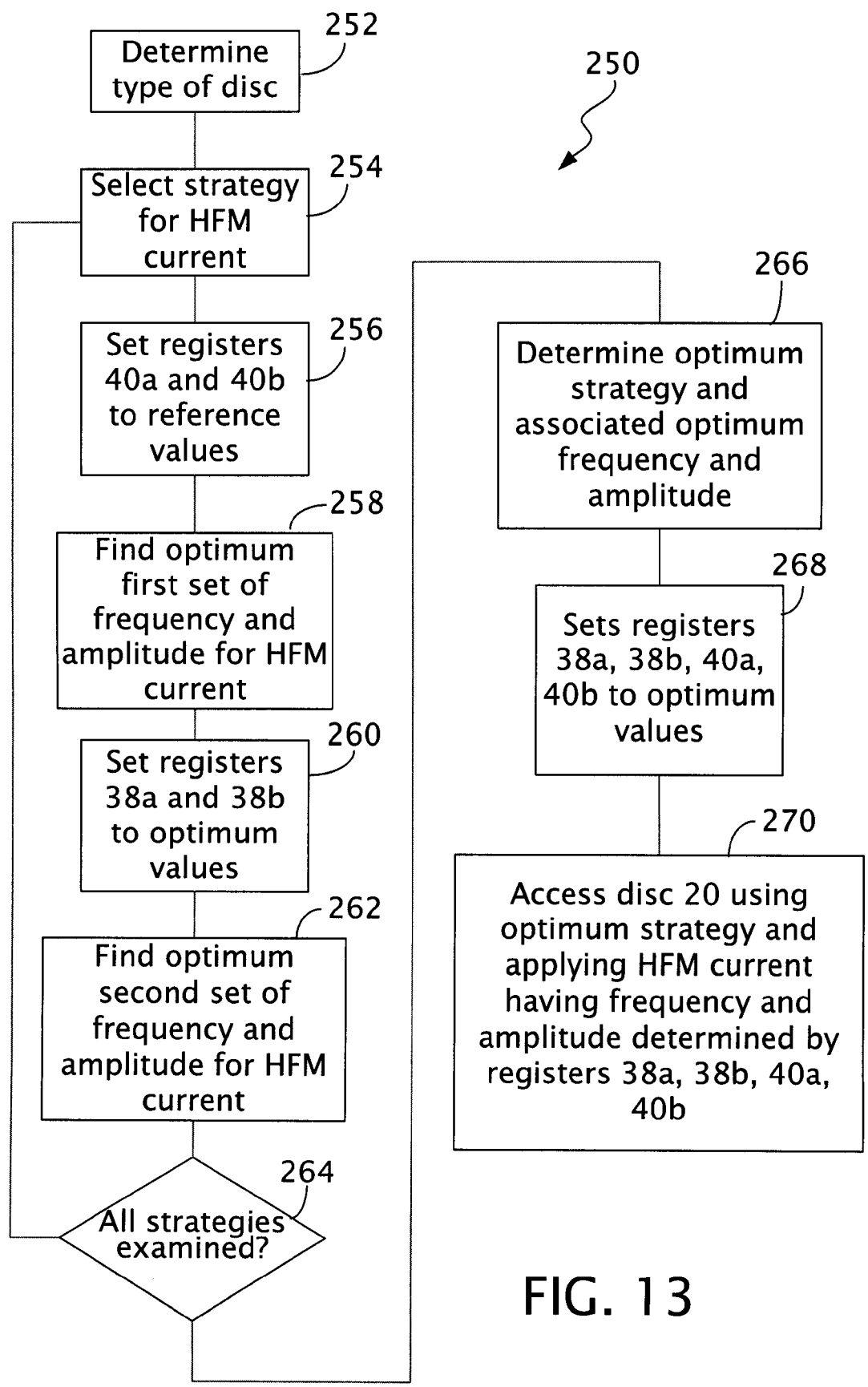

FIG. 13 shows a trial write process 250 for determining optimum frequencies and amplitudes of the HFM current 32. The disc drive controller 42 determines 252 the type of disc 20 being accessed, and selects one of a number of preset strategies for varying the HFM current 32. The strategies may include those shown in FIGS. 3, 4, 5, and 6. For each strategy, the disc drive controller 42 sets 256 registers 40a and 40b to reference values, and determines 258 optimum values for registers 38a and 38b by varying the register values 38a and 38b and finding a pair of register values that result in the least error rate for that strategy. The disc drive controller 42 sets 260 the registers 38a an 38b to the optimum values determined in step 258, and determines 262 optimum values for registers 40a and 40b by varying the register values 40a and 40b and finding a pair of register values that result in the least error rate.

The disc drive controller 42 determines 264 whether all strategies have been examined. If not all of the strategies have been examined, the process 250 loops back to step 254. If all of the strategies have been examined, the disc drive controller 42 determines 266 which strategy produces the least error rate, and records the register values that result in the least error rate for that strategy. The disc drive controller 42 sets 268 the registers 38a, 38b, 40a, and 40b using the values determined in step 266, and accesses 270 the disc 20 using the optimum strategy and optimum HFM frequency and amplitude values determined in steps 254 to 266.

In each of steps 258 and 262 in the process 250, the optimum set of frequency and amplitude can be determined by first setting the register values to a reference value, then varying the frequency and amplitude individually, or varying both frequency and amplitude according to a predetermined relationship.

The trial write process 250 can be executed whenever a new disc 20 is used, or upon request by a user to calibrate the system 10.

The controller 42 may include hard-wired logic or firmware for implementing the processes 220 and 250. The controller 42 may also operate according to software code to implement the processes 220 and 250.

Although some examples have been discussed above, other implementations and applications are also within the scope of the following claims. For example, the laser diodes 15a and 15b can be combined into a two-wavelength laser diode. The laser diode array 14 may include a blue laser diode that generates a laser beam having a wavelength of about 405 nm, which is used when the disc 20 is compatible with an optical standard that uses blue laser, e.g., a Blu-ray or High-Density DVD (HD DVD) disc. The control block 34 determines whether the laser driving current 88 is used to drive laser diodes 15a, 15b, or the blue laser diode. The laser diodes 15a, 15b, and the blue laser diode can be combined into a three-wavelength laser diode.

The data to be recorded to the disc 20 can be modulated according to modulation methods that are different from the EFM modulation, such as eight-to-fifteen or eight-to-sixteen (EFM plus) modulation, in which eight data bits are modulated to form 15 or 16 channel bits.

In FIG. 2, the control block 34 includes two pairs of registers, each pair determining a set of frequency and amplitude of the HFM current 32. More than two pairs of registers can be used, so that more than two sets of frequencies and amplitudes of the HFM current 32 can be set. In FIG. 9, the HFM current generator 172 has two pairs of resistors for setting the two sets of frequencies and amplitudes of the HFM current 32. More than two sets of resistors can be used to specify more than two sets of frequencies and amplitudes of the HFM current 32. The select signal 178 can include a multi-bit signal for selecting one of the sets of resistors.

The frequency and amplitude of the HFM current 32 may vary according to conditions not described above. For example, when the rotation speed of the disc changes, such as when changing from one of 4×. 6×, 8×, 10×, 12×, 24×, 32×, 36×, 48× speeds to another speed, the frequency and amplitude of the HFM current may change. The amplitude and frequency of the HFM current can be adjusted in response to a change between a constant linear velocity mode and a constant angular velocity mode. In the constant linear velocity mode, the linear velocity of the pickup head relative to the disc is constant regardless of whether the pickup head is at an inner track or an outer track of the disc. In the constant angular velocity mode, the angular velocity of the pickup head relative to the disc is constant regardless of whether the pickup head is at an inner track or an outer track.

Instead of an HFM current, an HFM voltage may be used. For example, the pickup head may include a recording voltage generator to generate a recording voltage signal, a read voltage generator to generate a read voltage signal, and an HFM voltage generator to generate an HFM voltage signal. The HFM voltage signal can be added to the recording voltage signal or the read voltage signal to generate a laser diode drive voltage signal.

The frequency of the HFM signal can have different ranges depending on the type of disc used. For example, the HFM signal can have frequencies from 200 MHz to 600 MHz, or even higher. The frequency of the HFM signal is selected to be away from the frequency ranges of the servo control signals and the data signals.

The technique of varying characteristics (e.g., frequency and amplitude) of the HFM signal to reduce error rate can also be used in read-only optical systems. For example, the system may include two or more laser diodes for reading from different types of media, and the HFM signal imposed on the read current for driving the laser diode is different for different laser diodes. The characteristics of the HFM signal may be adjusted in response to a change in velocity mode, such as from a constant linear velocity mode to a constant angular velocity mode, and vice versa. The frequency or amplitude of the HFM signal may be determined based on the type of medium being accessed.

What is claimed is:

1. A method comprising:
    modulating a light beam based on a trial write pattern and a high frequency modulation (HFM) signal;
    using the light beam to record trial write marks on an optical storage medium;
    detecting recorded trial write marks on the medium;
    adjusting at least one characteristic of the HFM signal based on detected recorded trial write marks; and
    recording the trial write marks on the medium using the light beam modulated based on the trial write pattern and the HFM signal having the adjusted characteristic.

2. The method of claim 1 in which the characteristic comprises at least one of a frequency and an amplitude.

3. The method of claim 2 comprising determining optimum values for the frequency and amplitude of the HFM signal that result in the least error rate based on the detected recorded trial write marks.

4. The method of claim 3 in which determining optimum values comprises determining optimum values for the frequency and amplitude of the HFM signal that result in the least address in pre-groove (ADIP) error rate.

5. The method of claim 2, comprising storing a value representing the determined frequency for the HFM signal that results in the least write error rate, and using the stored value to control the frequency of the HFM signal during a normal write process.

6. The method of claim 2 comprising selecting each one of a plurality of preset strategies for varying the frequency of the HFM signal, determining a frequency of the HFM signal that results in the least error rate for each of the preset strategies, and selecting a frequency that results in the least error rate among all the preset strategies.

7. A method comprising:
    modulating a light beam based on a trial write pattern and a high frequency modulation (HFM) signal;
    using the light beam to record trial first write marks on an optical storage medium;
    detecting recorded trial write marks on the medium;
    adjusting a frequency of the HFM signal based on detected recorded trial write marks; and
    recording the trial write marks on the medium using the light beam modulated based on the trial write pattern and the HFM signal having the adjusted frequency.

8. The method of claim 7 comprising determining an optimum value for the frequency of the HFM signal that result in the least error rate based on the detected recorded trial write marks.

9. A method comprising:
    performing a trial write process to determine at least one optimum value for at least one characteristic of a high frequency modulation (HFM) signal, including:
        recording trial write marks on the optical storage medium using a light beam modulated based on a trial write pattern and the HFM signal;
        detecting recorded trial write marks on the medium; and
        adjusting the at least one characteristic of the HFM signal based on detected recorded trial write marks; and
    repeating the recording of the trial write marks, the detecting of the recorded trial write marks, and the adjusting of the at least one characteristic of the HFM signal to determine the at least one optimum value for the at least one characteristic of the HFM signal that results in the least error rate.

10. The method of claim 9 in which the at least one characteristic comprises at least one of a frequency or an amplitude of the HFM signal.

11. The method of claim 10 in which determining the at least one optimum value comprises determining at least one optimum value for at least one of the frequency or amplitude of the HFM signal that results in the least address in pre-groove (ADIP) error rate.

12. The method of claim 10 in which determining the at least one optimum value comprises determining at least one optimum value for the frequency of the HFM signal that results in the least read error rate.

13. The method of claim 10 comprising storing a value in a register representing the determined frequency for the HFM signal that results in the least write error rate, and using the value in the register to control the frequency of the HFM signal during a normal write process.

14. The method of claim 10 comprising storing a value in a register representing the determined frequency for the HFM signal that results in the least read error rate, and using the value in the register to control the frequency of the HFM signal during a normal read process.

15. The method of claim 9 comprising selecting one of a plurality of preset strategies for varying the at least one characteristic of the HFM signal.

16. The method of claim 15, comprising determining a frequency of the HFM signal that result in the least error rate for each of the preset strategies, and selecting a frequency that results in the least error rate among all the preset strategies.

17. The method of claim 15 in which one of the preset strategies uses a first frequency for the HFM signal when in a write mode, and a second frequency for the HFM signal when in a read mode.

18. The method of claim 17 in which determining the at least one optimum value for the at least one characteristic of the HFM signal comprises determining a first frequency for the HFM signal that results in a least write error rate, and determining a second frequency for the HFM signal that results in a least read error rate.

19. The method of claim 15 in which one of the preset strategies modulates the light beam using the HFM signal when the trial write pattern has a high level, and not use the HFM signal to modulate the light beam when the trial write pattern has a low level.

20. The method of claim 15 in which one of the preset strategies uses a high amplitude for the HFM signal when the trial write pattern has a low level, and a low amplitude for the HFM signal when the trial write pattern has a high level.

* * * * *